United States Patent [19]
Mole

[11] Patent Number: 5,113,696
[45] Date of Patent: May 19, 1992

[54] WIND TUNNEL VARIABLE RANGE BALANCE

[75] Inventor: Philip J. Mole, San Diego, Calif.

[73] Assignee: General Drawings Corporation, Convair Division, San Diego, Calif.

[21] Appl. No.: 633,857

[22] Filed: Dec. 26, 1990

[51] Int. Cl.⁵ .............................................. G01M 9/00
[52] U.S. Cl. .................... 73/147; 73/862.04
[58] Field of Search ........................... 73/147, 862.04

[56] References Cited

U.S. PATENT DOCUMENTS

| | | | |
|---|---|---|---|
| 2,918,816 | 12/1959 | Ormond | 73/147 |
| 3,878,713 | 4/1975 | Mole | 73/147 |
| 4,688,421 | 8/1987 | Pzsolla | 73/147 |
| 4,845,993 | 7/1989 | Horne | 73/147 |
| 4,938,059 | 7/1990 | Fauche et al. | 73/147 |

Primary Examiner—Donald O. Woodiel
Attorney, Agent, or Firm—John R. Duncan; Frank D. Gilliam

[57] ABSTRACT

An improved wind tunnel six component balance that is capable of accurately measuring low loads and high loads. The variable range balance has low load axial elements that will measure low loads precisely. When the load is increased over the low range capability of the measuring elements, in either the positive or negative load direction, pressure is applied to either the forward or aft bellows that are mounted in the inner tubular rod of the balance. This pressure applies a counter balance in force that reacts against the load applied. The results of this force is that the low loads links will always stay on range.

6 Claims, 2 Drawing Sheets

WIND TUNNEL VARIABLE RANGE BALANCE

BACKGROUND OF THE INVENTION

The invention relates generally to force measuring instruments and more particularly to an instrument for measuring multiple loads on full scale flight articles, structural test loading, static test items, any more particularly to an instrument for measuring the forces on wind tunnel models.

There are six components of the force and moment action on a model which are of interest to the designer in evaluating the flying qualities of an aircraft. These six components are well known by those skilled in the art as lift force, drag force, side force, pitching moment, yawing moment, and rolling moment. When determining the magnitude of these components acting on a scale model in a wind tunnel, certain design perimeters can be obtained which will apply to the full scale aircraft.

Prior art strain gage balances have been successfully utilized to measure the forces in wind tunnel models. The moments and forces acting on the model were usually resolved into three components of force and three components of moments but providing different members within the balance that were sensitive only to one or two components. Each of the members carry strain gages which were connected in combinations that formed Wheatstone bridge circuits. By appropriately connecting the strain gages, the resulting Wheatstone bridge circuit unbalances could be resolved into readings of the three components of force and three components of moment. All access to the model is by way of the sting support, having the balance attached to the upstream end. The balance is small enough to fit through the aft end of the model into a cavity within the model.

Thus it can be seen that all tubes, hoses, wires and such must compete within the balance or the small cross section of area available within the slim cavity of the models.

Wind tunnels require the use of six component load measuring devices to measure the load on wind tunnel models within 0.3 percent of maximum load accuracy. Prior art balances have been designed for a defined maximum load. The accuracy of these balances is based on percent of maximum load capacity. This results in large errors at low loads. The normal variation in axial force during wind tunnel testing is 10 to 1. This means that a large majority of testing is at 0.1 of maximum load capacity of the load measuring element. The result is data accuracies of ten times the required balance accuracy.

It is an object of the invention to provide a novel six component balance that can provide significantly increased accuracy when measuring loads varying from a low load to the maximum loads.

SUMMARY OF THE INVENTION

Applicant's novel variable range balance has been designed to use low load axial elements which will measure low loads precisely. These low load axial force gage elements are axially mounted on the fore and aft sides of the free motion central disc member. This member is rigidly secured to the central sleeve portion of the model attachment outer shell assembly. The respective opposite ends of these low load axial force gage elements are fixedly secured to the respective forward and aft plug members which are rigidly secured to the inner tubular rod which is normally attached to the sting.

When the load is increased over the low range capability of the low load axial force gage elements, in either the positive or negative load direction, pressure is applied to either the forward or aft bellows. This pressure applies a counterbalancing force (pressure x area) that reacts against the load applied. The results of this force is that the low load links will always stay on range.

With the total force applied to the balance within the low load range, the force would simply be the output of load links multiplied by a constant. This is the main feature that results in high accuracy at low loads. The total load force on the balance with higher loads is equal to the pressure in the bellows times the effective area of the bellows, plus or minus the electrical output of the load links times a constant. It can be seen that this error would be larger because of the two measurements but the load is also larger, resulting in the same high accuracy. This system would also use a Servo-Loop in order to automatically change the pressure in the bellows to maintain the load within the low load element range. This pressure in the bellows could be introduced using either air or hydraulics. This counter balancing method could be used on any or all six components of the balance, if required.

DESCRIPTION OF THE PREFERRED EMBODIMENT

Figure 1:
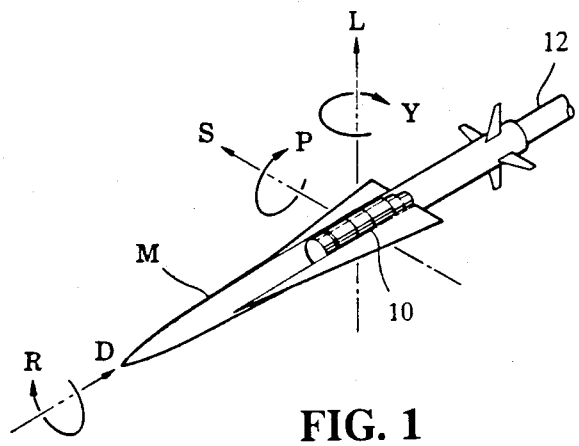
FIG. 1 shows the balance supporting a model within a wind tunnel.
Figure 2:
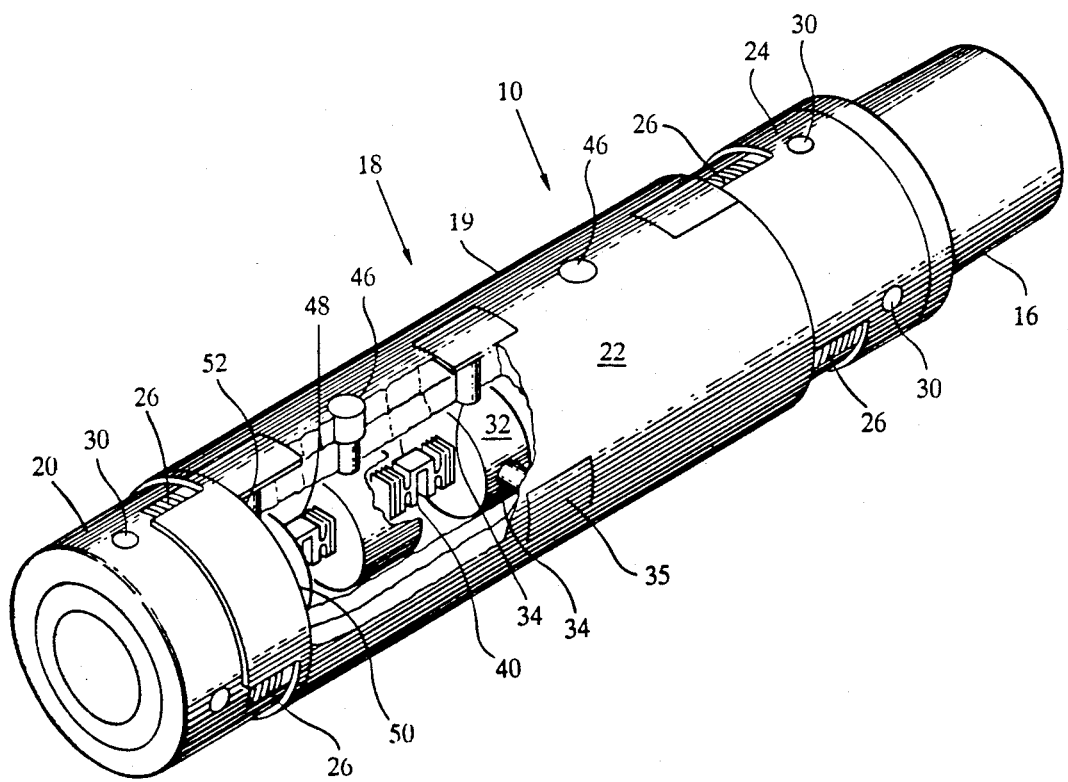
FIG. 2 is a perspective view of the balance with portions broken away.
Figure 3:
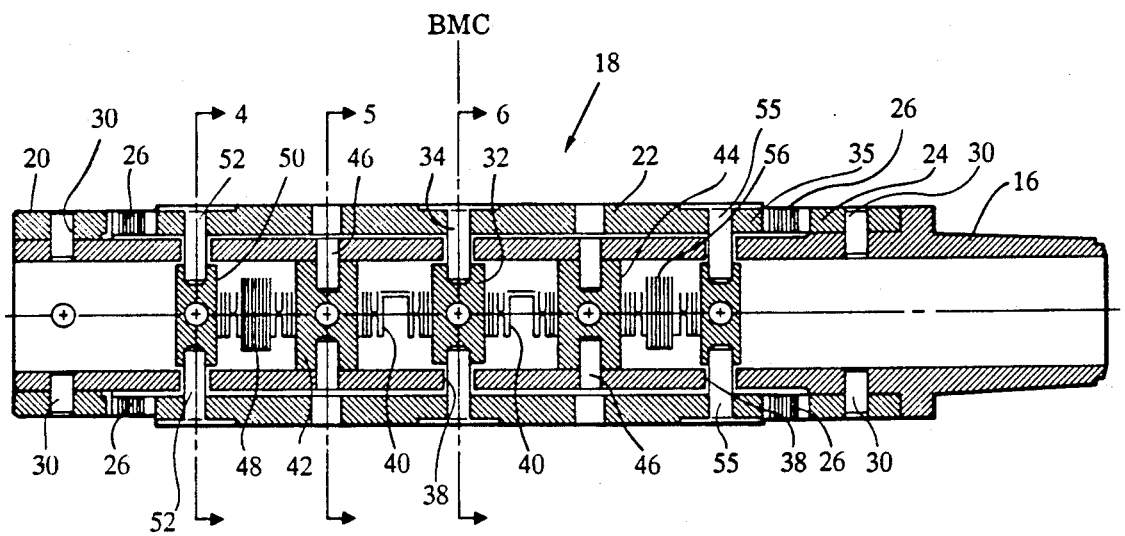
FIG. 3 is a longitudinal cross sectional view of the balance.
Figure 4:
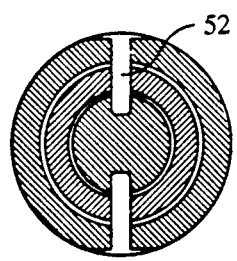
FIG. 4 is a cross sectional view taken along lines 4—4 of FIG. 3.
Figure 5:
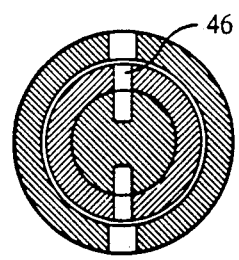
FIG. 5 is a cross sectional view taken along lines 5—5 of FIG. 3.
Figure 6:
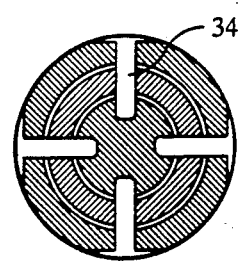
FIG. 6 is a cross sectional view taken along lines 6—6 of FIG. 3.

Referring to FIG. 1, there is schematically illustrated a typical installation wherein a model M is positioned in a wind tunnel by means of the balance 10 and a sting 12 aligned in a generally horizontal position and projecting upstream in the wind tunnel. The model M engages a portion of the balance 10 in such a manner that the three components of moment and the three components of force will be detected by the balance 10. These components are shown in FIG. 1 wherein the roll moment is indicated by the circular arrow R, the pitching moment by the circular arrow P, the yaw moment by the circular arrow Y, the drag force by arrow O, the side force by the arrow S, and the lift force by the arrow L.

The balance is disposed near the center of gravity of the model and all forces detected by the balance are communicated by means of electrical wires which are routed through the sting 12 through a stationery base (not shown). In a like manner tubes for communicating fluids, such as air, to the model are routed through the hollow sting 12.

The structure of the balance 10 will be best understood by referring to FIGS. 2-6. Balance 10 has an elongated inner tubular rod 16 that extends throughout the entire length of the model attachment shell assembly 18. The sting is attached to one end of the rod 16 in a manner described and explained in U.S. Pat. No. 3,878,713. Shell assembly has three major components, outer sleeve portion 18, forward sleeve portion 20 central sleeve portion 22, and aft sleeve portion 24. Outer sleeve portion 18 is fixedly connected to a cavity in the model M, in place thereof sleeve portion 20 is axially connected to central sleeve portion 22 by conventional side force normal force web gage elements such as illustrated and described in U.S. Pat. No. 3,878,713. Likewise, aft sleeve portion 24 is axially connected to central sleeve portion 22 by similar web gage elements 26.

Forward sleeve portion 20 is rigidly secured to inner tubular rod 16 by attachment pins 30 and a brazed section. Likewise, aft sleeve portion 24 is rigidly secured to inner tubular rod 16 by attachment pins 30 and a brazed section.

Free motion central disc member 32 is mounted within balance 10 at the balance moment center (BMC). It is rigidly secured to central sleeve portion 22 by connecting pins 34 that have an outer base plate 35 on their outer ends. Connecting pins 34 pass through oversized bore holes 38 in inner tubular rod 16. Bore holes 38 thus provide a sufficient gap so that central disc member 32 can travel axially a predetermined distance. Low load axial force gage elements 40 are connected to the respective front and rear surface of central disc member 32. Their opposite ends are respectively connected to forward plug member 42 and aft plug member 44. Attachment pins 46 rigidly secure the respective plug members to inner tubular rod 16. Forward bellows 48 has its one end connected to forward plug 42 and its other end connected to free motion forward disc member 50. Connecting pins 52 rigidly secure forward disc member to central sleeve portion 22. Aft bellows 56 has its one end connected to aft plug member 44 and its other end connected to free motion aft disc member 58. Connecting pins 55 also rigidly secure aft disc member to central sleeve portion 22.

Conventional strain pages (not shown) are mounted on the respective web gage elements 26 and low load axial force gage elements 40. It should be clearly understood that axial forces applied to the model will be transmitted through the central sleeve portion 22 to the low load axial force gage element 40. Also axial and rotational forces applied to the model will be transmitted through central sleeve portion 22 to the web gage elements 26.

It is to be understood that certain changes, alterations, modifications and substitutions can be made without departing from the spirit and scope of the appended claims.

What is claimed is:

1. A wind tunnel balance comprising:
   an elongated inner tubular rod having a front end, rear end, an inner surface and outer surface;
   the rear end of said inner tubular rod having structure for detachably connecting to a sting;
   a model attachment assembly formed of an outer shell which is fixedly attached to said model, a forward sleeve portion, a central sleeve portion, and an aft sleeve portion, a plurality of web gage elements connecting said aft sleeve portion to said central sleeve portion;
   said inner tubular rod being inserted into said assembly;
   means for rigidly securing said aft sleeve portion to said inner tubular rod;
   the inner diameter of said central sleeve portion being greater than the other diameter of said inner tubular rod so that said central sleeve portion is free to move axially, laterally and rotationally;
   a free motion central disk member positioned inside said tubular rod at the balance moment of center;
   means for rigidly connecting said central disk member to the central sleeve portion of said outer shell assembly so that they may move as a single unit;
   a forward plug member positioned a predetermined axial distance in front of the central disk member inside said tubular rod and means for rigidly connecting said forward plug member to said inner tubular rod; and
   a longitudinal extending low load axial force gage element connected between said forward plug member and said central disk member.

2. A wind tunnel balance as recited in claim 1 further comprising a free motion forward disc member positioned a predetermined axial distance in front of said forward plug member and means for rigidly connecting said forward disc member to the central sleeve portion of said outer shell assembly so that they move as a single unit.

3. A wind tunnel balance as recited in claim 2 further comprising an axially oriented forward bellows having a forward end that is connected to said forward disc member and also having a rear end that is connected to said forward plug member.

4. A wind tunnel balance as recited in claim 1 further comprising an aft plug member positioned a predetermined axial distance rearwardly of the central disc member inside said inner tubular rod and means for rigidly connecting said aft plug member to said inner tubular rod; and
   a longitudinally extending low load axial force gage element connected between said aft plug member and said central disc member.

5. A wind tunnel balance as recited in claim 4 further comprising a free motion aft disc member positioned a predetermined axial distance rearwardly of said aft plug member and means for rigidly connecting said aft disc member to the central sleeve portion of said outer shell assembly so that they move as a single unit.

6. A wind tunnel balance as recited in claim 5 further comprising an axially oriented aft bellows having a rear end that is connected to said aft disc member and also having a forward end that is connected to said aft plug member.

* * * * *

UNITED STATES PATENT AND TRADEMARK OFFICE
CERTIFICATE OF CORRECTION

PATENT NO. : 5,113,696
DATED : May 19, 1992
INVENTOR(S) : Philip J. Mole

It is certified that error appears in the above—identified patent and that said Letters Patent is hereby corrected as shown below:

On the title page of the patent, data element [73] is corrected to read:

--General Dynamics Corporation
Convair Division, San Diego, Calif.--.

Signed and Sealed this

Sixteenth Day of March, 1993

Attest:

STEPHEN G. KUNIN

*Attesting Officer*  *Acting Commissioner of Patents and Trademarks*